A. A. QUICK.
APPARATUS FOR THE CONVERSION OF ALTERNATING MOVEMENTS INTO PROGRESSIVE ROTARY MOTION.
APPLICATION FILED JULY 7, 1915.

1,293,920.

Patented Feb. 11, 1919.
5 SHEETS—SHEET 1.

INVENTOR
Alfred A. Quick
by Foster Freeman Watson Hirt Attys

A. A. QUICK.
APPARATUS FOR THE CONVERSION OF ALTERNATING MOVEMENTS INTO PROGRESSIVE ROTARY MOTION.
APPLICATION FILED JULY 7, 1915.

1,293,920.

Patented Feb. 11, 1919.
5 SHEETS—SHEET 3.

INVENTOR
Alfred A. Quick
by Foster Freeman Watson Hart Attys

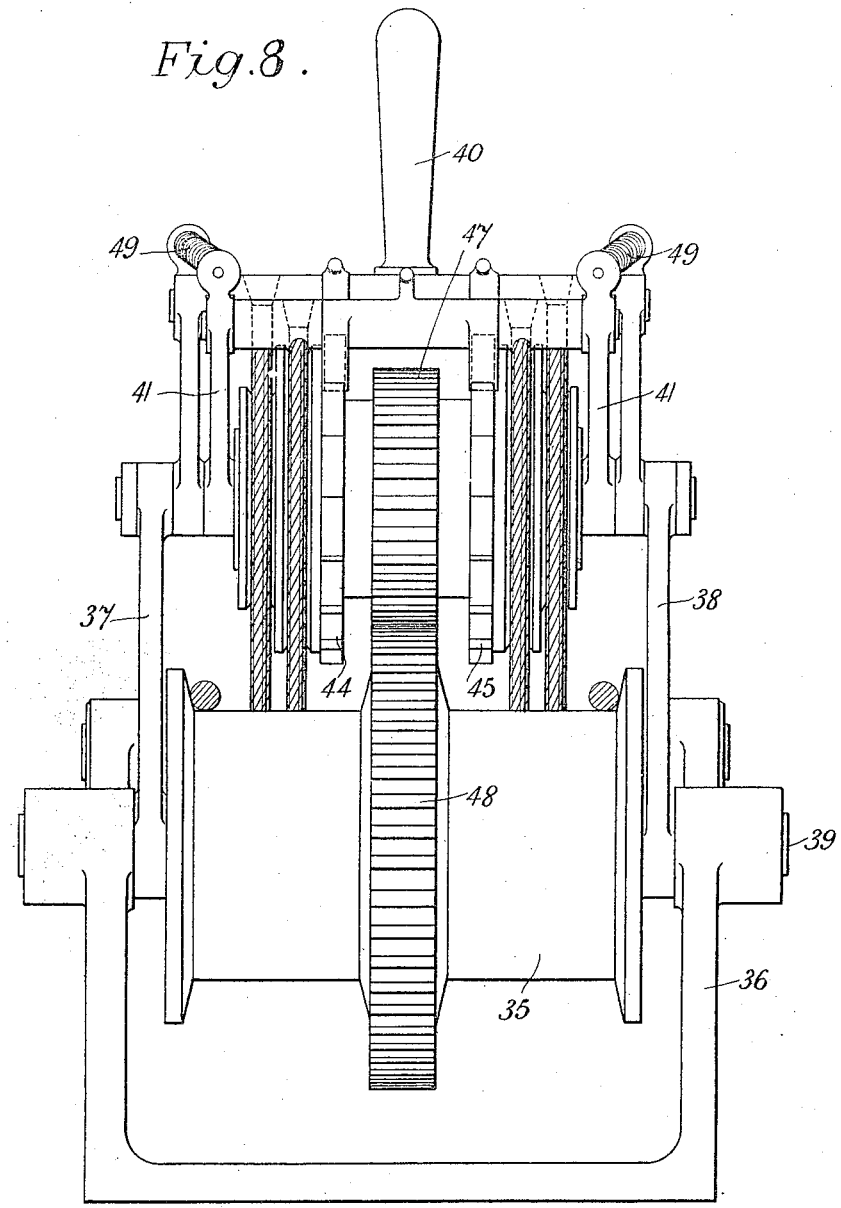

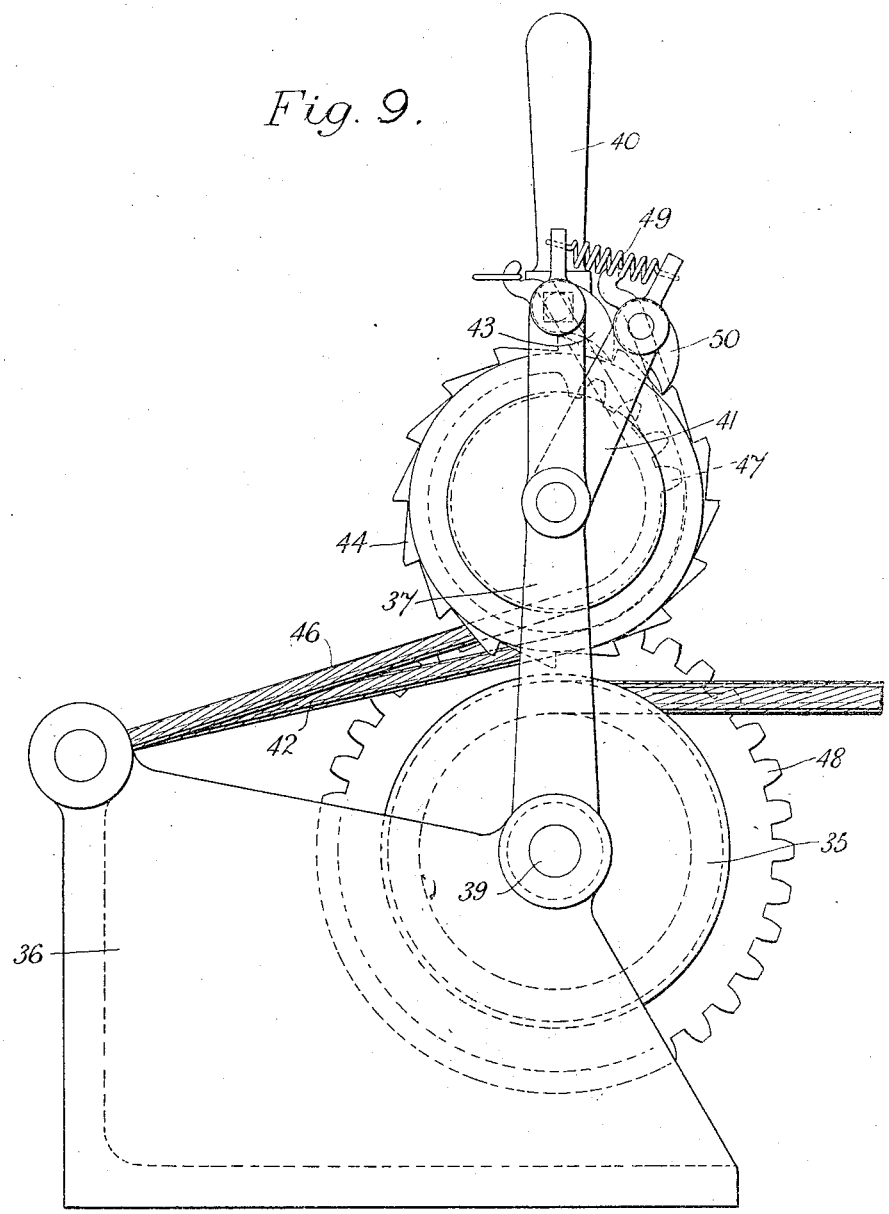

UNITED STATES PATENT OFFICE.

ALFRED ARTHUR QUICK, OF LONDON, ENGLAND.

APPARATUS FOR THE CONVERSION OF ALTERNATING MOVEMENTS INTO PROGRESSIVE ROTARY MOTION.

1,293,920.  Specification of Letters Patent.  Patented Feb. 11, 1919.

Application filed July 7, 1915. Serial No. 38,481.

*To all whom it may concern:*

Be it known that I, ALFRED ARTHUR QUICK, a subject of His Majesty the King of Great Britain, and a resident of London, England, have invented a certain new and useful Improvement in Apparatus for the Conversion of Alternating Movements into Progressive Rotary Motion, of which the following is a specification.

This invention relates to an improvement in apparatus for converting alternating reciprocating movements into progressive rotary motion for the purpose of obtaining a progressive rotary movement on a wheel or the like whereby a rope or the like may be wound thereon, and, in some cases, translating such rotary movement into straight line movement upon a rack, and, in other cases, imparting a similar rotary movement to another wheel upon which a rope or the like may be wound, the invention being applicable for example to winding drums, pulley blocks, hoists, tree pullers, winches, presses, lifting jacks and other purposes.

More specifically set out, the invention consists in the provision of a differential device which may be caused to roll on a track formed by a resisting member or members and a hauling, lifting or like member or members controlling the load to be pulled, lifted or otherwise dealt with, the arrangement of the parts being such that the differential device is gradually and progressively rotated in one direction or the other whereby the hauling, lifting or like member, and consequently the load, is moved toward or away from the apparatus.

An apparatus formed according to one example of construction may comprise two or more drums, toothed wheels or quadrants of differential pitch periphery or a combination of same, having ropes or chains, or toothed racks or wheels, to engage with same working in conjunction with retaining pawls and having an operating lever or levers worked with a reciprocating motion. Such drums or the like act in conjunction with a third drum or the like two at least or all three being of different diameters.

One of these drums, say the smaller, carries for example a flexible device such as a cord the end of which is secured to a fixed point and another drum carries another flexible device or cord, or in other ways is arranged to move a desired object such as a load and the third drum carries another flexible device or cord which is also secured to a fixed point the ropes or the like all being led off from the same side of the drums the centers of which are co-axial. The two fixed ropes are wound on their respective drums in the same direction and the load ropes in the opposite direction. If the drums are rolled say toward the load as one piece upon the track formed by the load rope or the like by any suitable means, then two of the ropes, *i. e.* one of the fixed ropes and the load rope or the like will become taut and the third or other fixed rope will become slack. If mechanism is provided which will then take up the slack of the third rope and the drums as a whole are wound back away from the load on the track formed by the fixed rope or ropes, the result will be a tightening of the rope which was previously slack while the rope which was previously tight becomes slack, the load rope remaining tight and pulling on the load; the slack in the fixed rope is then taken up and the drums rolled toward the load as before. Owing to the different pitch circumference of the drums, the load will be moved either on the forward or backward rolling movements, or, on both forward and backward rolling movements, depending on whether one or all the drums are of different pitch diameter.

In the accompanying drawings which illustrate this invention by way of example:

Figs. 8 and 9 are front and side elevations respectively of a modified form of hauling apparatus constructed in accordance with this invention, and Fig. 10 is a diagrammatic view of an alternative arrangement for the operating levers shown in Figs. 1 and 2, and 8 and 9.

Figure 1:
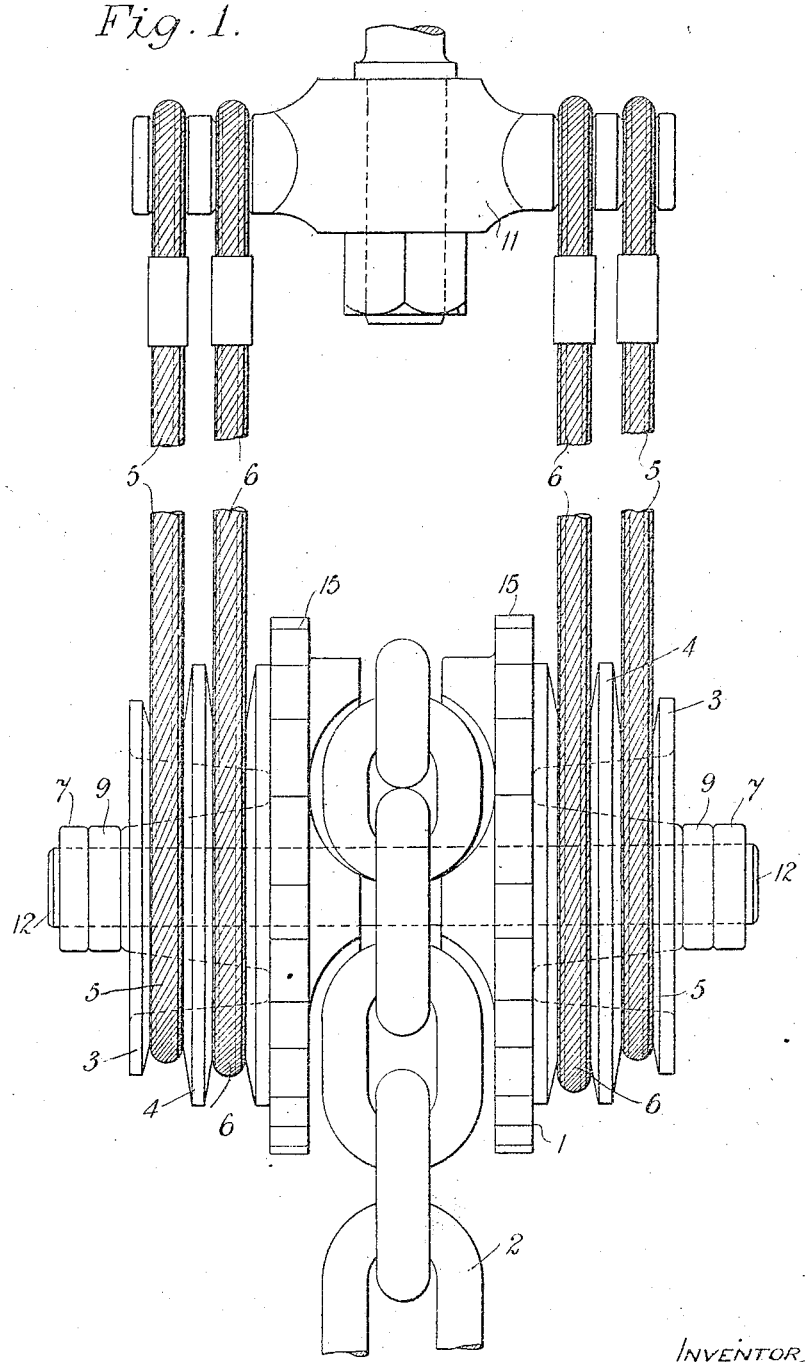
Figures 1 and 2 are front and side elevations respectively of a hauling apparatus arranged in accordance with this invention.
Figure 2:
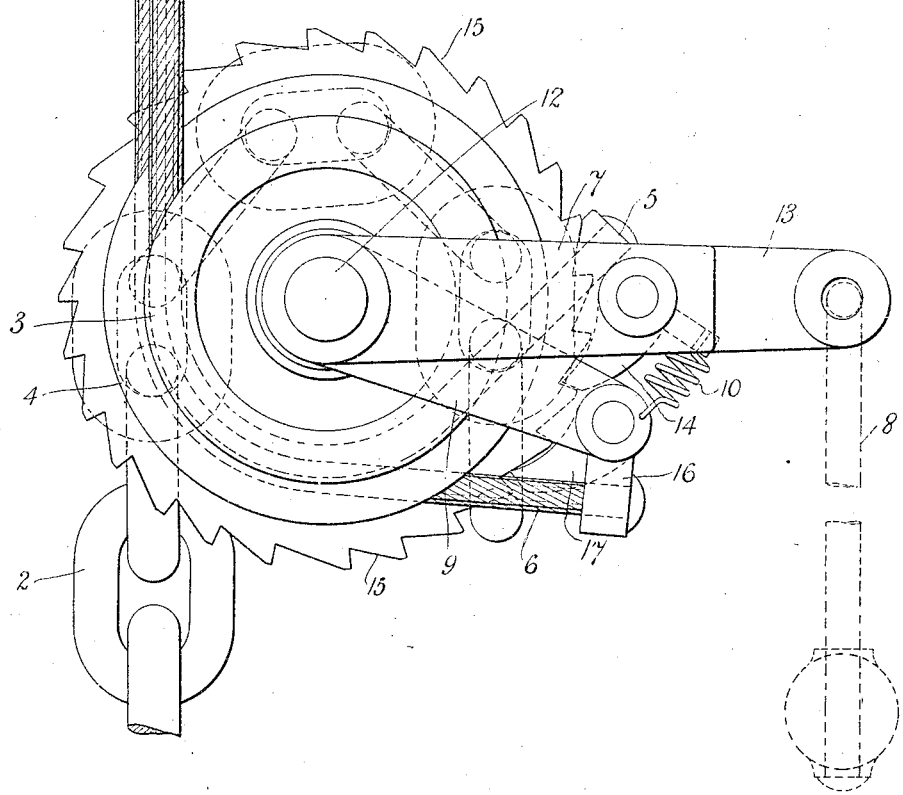

Referring to Figs. 1 and 2, the apparatus comprises the following main elements: 1 the drum for the hauling member 2, shown in this case as a chain, 3 and 4 the drums for the anchor ropes, 5 and 6, 7 a double armed operating lever, carrying a pawl or pawls 14, a partial rotative movement being imparted to said lever by a rod 8, to which a reciprocating motion is imparted, 9 a second double armed lever carrying a pawl or pawls 17 such lever being connected by a spring or springs 10 with the lever 7, and, 11 the anchor bar to which the ropes 5 and 6 are fixed.

As shown in these figures the apparatus is provided with four anchor ropes and four drums, two being located on either side of the central drum, by means of this arrangement a more even pull is exerted on the axis than if the anchor ropes were wound on drums located at one side of the load chain drum, as will be readily understood.

The load is always carried by the hauling rope or ropes and one or more anchored ropes, save just at that time when the action of the device is being reversed at which time the load is momentarily taken by all the ropes.

The operating lever 7 is mounted on the spindle 12, the two arms being connected by a yoke or cross bar 13 to the outer end of which the rod 8 is connected. The ends of the anchor ropes 5 are connected to the yoke 13, and spring controlled pawls 14, pivotally mounted on such lever, are adapted to engage with ratchet teeth 15 formed on the peripheral edges of the side walls of the drum 1. The radial levers 9 are also connected by a yoke or cross bar 16 to which the ends of the anchor ropes 6 are connected, and spring controlled pawls 17, pivotally mounted on such lever, are adapted to engage with the teeth 15 on the drum 1.

When ropes are said to be in tension due to the load, said ropes are locked on their drums and held there by the pawls and ratchet wheels referred to, and when slack, said ropes are unlocked or capable of slipping on their drums.

The operation of the apparatus will be described with reference to Figs. 3 to 7.

In these figures the load to be moved is represented by 18, and, for the sake of clearness, only two anchor ropes will be referred to, though as will be understood, the corresponding ropes on either side will act in unison. In Figs. 1 and 2 the pitch diameters of the chain 2 and rope 6 are the same; there will therefore not be any movement of the load during the backward rolling movement of the drum but only on the forward movement. In order however, in Figs. 3 to 7, to illustrate the operation with greater clearness the pitch diameters of all three drums are shown as different. Assuming that the chain 2 is connected to the drum 1 at the point $2^x$, that the ropes 5 and 6 are connected to the drums 3 and 4 at the points $5^x$ and $6^x$ respectively in such a manner that they are capable of being moved to fresh positions such as by the pawls 14 and 17 and ratchet teeth 15 above described:—

Figure 3:
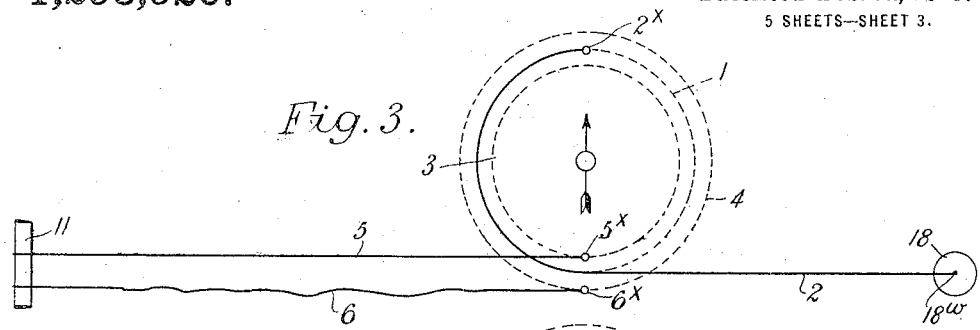
Figs. 3 to 7 are views diagrammatically illustrating the various movements of the apparatus from and to the end of a movement toward the load after having completed one backward and one forward movement.
Figure 4:
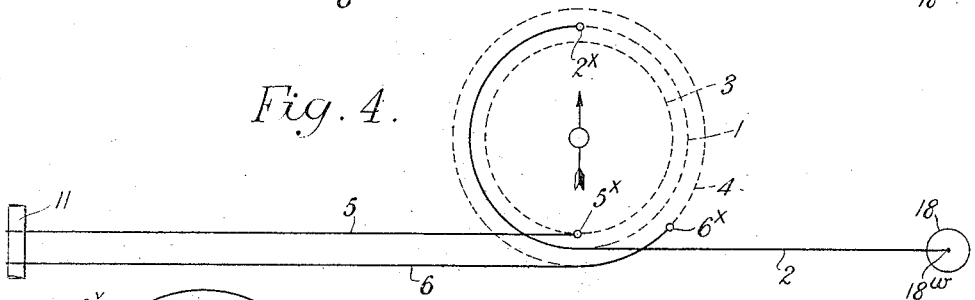
Figure 7:
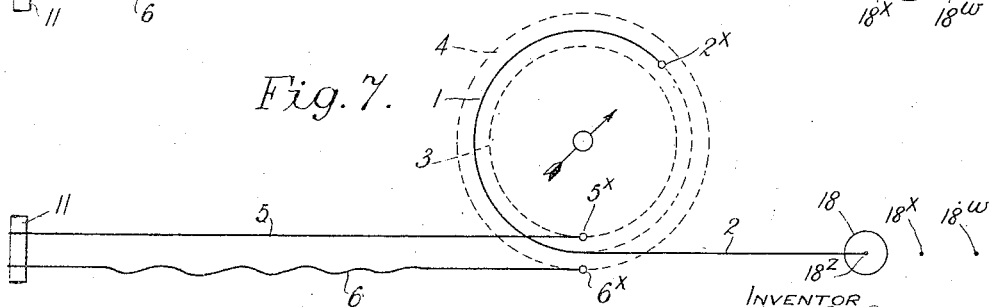

In the position shown in Fig. 3 the drums are assumed to have completed a rolling movement toward the load so that the chain 2 and rope 5 are in tension whereas the rope 6 is slack. This slack in rope 6 is taken up by moving the radial arms 9 until the point $6^x$ occupies the position shown in Fig. 4. The drums are then rolled away from the load through say half a revolution so that the point $2^x$ is brought into the position shown in Fig. 5, the tension on chain 2 being maintained by the tension on rope 6 and as the drum 4 is larger than the drum 3, more rope will be wound thereon so that rope 5 will be slack and the rope 6 will carry the load. The result of this movement of the drum is to draw the load from the point $18^w$ to the point $18^x$. The slack is then taken up by moving the radial arms 7 until the point $5^x$ occupies the position shown in Fig. 6. The drums are now moved toward the load into their former position, the result of which is to transfer the load to rope 5 and to slacken the rope 6. The point $2^x$ will as a result of this movement be moved to a new position on the drum 1 as shown in Fig. 7 and the load 18 will have been moved an amount equal to the distance $18^w$, $18^x$, so that it now occupies the position $18^z$ the total distance $18^w$, $18^z$ being approximately equal to the distance the point $2^x$ has moved on the drum.

The above operations are repeated and the drums are gradually and progressively rotated and the load hauled toward same.

Figure 5:
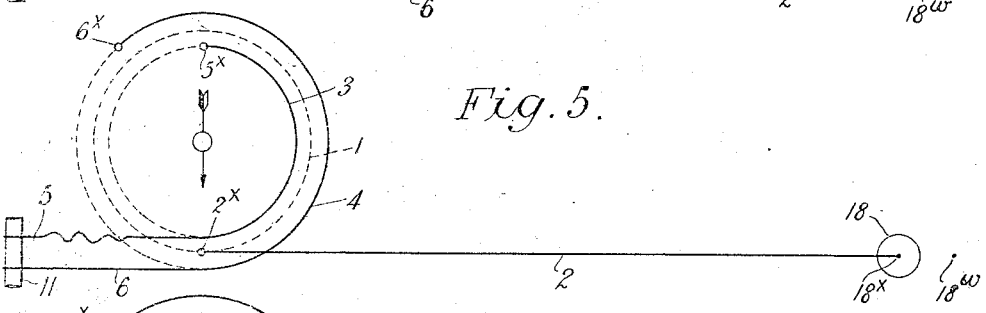
Figure 6:
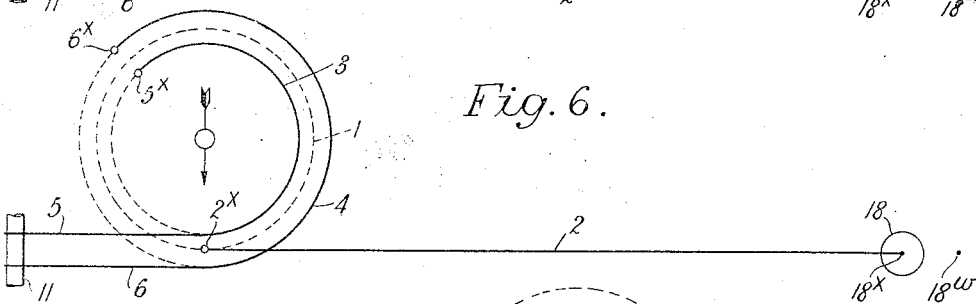

It will be understood that while in Figs. 3, 5 and 7, one of the anchor ropes is shown slack, in actual working this slack will be taken up automatically as produced by the movement of the levers 7 and 9 and the pawls carried thereby, in the manner hereafter more particularly described with reference to Figs. 8 and 9.

By means of this arrangement of parts it is possible to obtain a high purchase with a relatively short lever and to allow a longer working stroke to be employed.

It will be obvious that a toothed element carried by a lever may be arranged to coact with a further toothed element, say on a drum, whereby a progressive rotary movement is imparted to such drum; the toothed element on the lever in this case would roll on the co-acting toothed element, the point of oscillation being located in the same axial line as the axis of the drum to which it is desired to impart motion, in a similar manner to that illustrated in Figs. 8 and 9 hereafter described.

If desired the means shown in Figs. 1 and 2 may be combined with toothed elements, thereby giving a combination of the flexible means with the toothed means. A form of construction illustrating such a combination is illustrated in Figs. 8 and 9, according to which it is desired to impart a progressive rotary motion to a drum 35 mounted on a fixed frame 36. The reciprocating elements, which are similar to those illustrated in Figs. 1 and 2, are carried on arms 37, 38, pivotally mounted on the shaft 39 upon which the drum 35 is mounted. As the lever 40 is moved to the left (Fig. 9) the lever being shown in the position it will occupy at the end of a working stroke, the tendency will be for the radial levers 41 to which the ropes 42 are connected, to lag behind the lever 40, by reason of the fact that the load is supported by the rope 42, so that the pawls 43 carried by the lever 40 are caused to advance and engage with teeth on the ratchet wheels 44, 45, in advance of those with which they are shown in engagement in Fig. 9, which thus enables the grooved drum carrying the rope 46 to partly rotate and thus maintain said rope taut notwithstanding the fact that the drum around which it passes is of smaller diameter than the drum around which the rope 42 passes, both of such drums being in this case loosely mounted on the shaft carrying same. As this movement of the lever 40 to the left is taking place the toothed wheel 47 rolls on the toothed wheel 48 on the drum 35, the ropes 42 and 46 thereby become wrapped around their respective grooved drums.

When the lever 40 is moved in the reverse direction, that is, to the right (Fig. 9) so as to return it to the position shown, the load will be transferred from the rope 42 to the rope 46 and the rope 42 will tend to unwind quicker from its drum than the rope 46 but as the radial lever 41 is connected to the lever 40 by means of the springs 49 any slack that might otherwise arise in the rope 42 is automatically taken up by the backward pull of said springs and the pawls 50, carried by the lever 41 are caused to engage with teeth on the ratchet wheels 44, 45, in advance of those with which they originally engaged. During this movement to the right the amount of progressive rotation of the toothed wheel 47 will depend upon the difference between the pitch circumferences of the wheel 47 and of the ropes on their respective drums and the arc of travel passed through.

The progressive movement of the wheel 47 thereby attained is transmitted to the drum 35 by means of the toothed wheel 48, the hauling rope will thereby be wound thereon.

In order to enable the rope on the drum 35 to be paid off, mechanical or hand operated means are provided for taking the pawls 43 and 50 out of engagement with the ratchet wheels 44, 45.

It will be understood that, instead of the levers 9 and 13, and 40 and 41 being connected by the springs 10 and 49 respectively, the desired movement may be effected by automatic means other than springs or by manually operated means, such as by means of a cranked lever 51 as shown in Fig. 10.

What I claim is:—

1. In apparatus for converting alternating reciprocating movements into progressive rotary motion, a differential device composed of a plurality of rotatable elements of different pitch periphery, a pair of resisting elements engaging and co-acting with the rotatable elements of largest and smallest diameters respectively, a load controlling element engaging and co-acting with a rotatable element of intermediate diameter, an operative element for imparting a reciprocating rotary motion to the differential device to which one of said resisting elements is connected, a second operative element co-acting with the first named operative element to which the second resisting element is connected, said operative elements having a limited independent rotary movement apart from each other on an axis coincident with the axis of rotation of the differential device, means for connecting said operative elements to the rotatable element of intermediate diameter and means connecting said operative elements normally tending to draw them toward each other.

2. In apparatus for converting alternating reciprocating movements into progressive rotary motion, a differential device composed of a plurality of rotatable elements of differential pitch periphery, a plurality of resisting elements engaging and co-acting with the rotating elements of largest diameter, a plurality of resisting elements engaging and co-acting with the rotating elements of smallest diameter, a load controlling element engaging and co-acting with a rotatable element of intermediate diameter, a lever for imparting a reciprocatory motion to the differential device to which the resisting elements co-acting with the rotating elements of largest diameter are connected, a second lever co-acting with the first named lever to which the resisting elements co-acting with the rotating elements of smallest diameter are connected, said levers having a limited independent rotary movement apart from each other on an axis co-axial with the axis of the differential device, means for positively connecting said levers with the rotatable element of intermediate diameter when the latter is reciprocated in one direction, but to move independently thereof when reciprocated in the other direction so as to impart a progressive rotary motion to said rotatable element, said means also positively preventing said rotatable element from returning to its original position, and means connecting said levers normally tending to draw them toward each other.

3. In apparatus for converting alternating reciprocating movements into progressive rotary motion, a differential device composed of a plurality of drums of differential pitch periphery, a plurality of resisting members co-acting with the drums of largest and smallest pitch periphery, a load controlling member co-acting with the drum of intermediate pitch periphery, operating levers mounted on an axis co-axial with said drums to which the ends of said resisting members are connected, said levers being worked with a reciprocating motion, pawls carried by said levers, ratchet teeth formed on the last named drum with which said pawls engage and means normally tending to draw said levers toward each other.

4. In apparatus for converting alternating reciprocating movements into progressive rotary motion, a differential device composed of a plurality of rotating elements of differential pitch periphery, a plurality of resisting elements co-acting with the rotatable elements of largest and smallest pitch periphery, a load controlling element co-acting with the rotatable element of intermediate pitch periphery, a radial member to which the resisting elements co-acting with the rotatable elements of smallest pitch periphery are connected, a second radial member to which the resisting elements co-acting with the rotatable elements of largest pitch periphery are connected, means carried by both of said radial members for engaging with the rotatable element of intermediate pitch periphery in one direction only, and means for imparting a reciprocating movement to the first named radial member and thereby a partial rotative movement to the rotatable element of intermediate pitch periphery with which the load controlling element co-acts.

5. In apparatus for converting alternating reciprocating movements into progressive rotary motion, a differential device composed of a plurality of drums of different pitch periphery, a plurality of resisting members co-acting with the drums of largest and smallest pitch periphery, a load controlling member co-acting with the drum of intermediate pitch periphery, a centrally arranged spindle passing through said drums, a radial arm mounted on each end of said spindle, a yoke piece connecting the outer ends of said radial arms to which the resisting elements co-acting with the drums of smallest pitch periphery are connected, two further radial arms mounted on said spindle, a yoke connecting the outer ends of said last-named radial arms, to which the resisting elements co-acting with the drums of largest pitch periphery are connected, means yieldingly connecting the first named with the last named radial arms, means for imparting a reciprocating movement to the said yoke pieces independently of the drums in one direction, and means carried by both of said yoke pieces for engaging with the drum of intermediate pitch periphery in the reverse direction for imparting a partial rotative movement to said drum, said means also acting to retain the drum in the advanced position.

In testimony whereof I have hereunto set my hand.

ALFRED ARTHUR QUICK.

Copies of this patent may be obtained for five cents each, by addressing the "Commissioner of Patents, Washington, D. C."